US012639928B2

(12) United States Patent
Wen et al.

(10) Patent No.: US 12,639,928 B2
(45) Date of Patent: May 26, 2026

(54) SELF-SUPERVISED LEARNING METHOD AND APPARATUS FOR PROCESSING MEDICAL IMAGING DATA

(71) Applicant: Tencent Technology (Shenzhen) Company Limited, Shenzhen (CN)

(72) Inventors: Qingfu Wen, Shenzhen (CN); Yuexi Du, Shenzhen (CN); Sen Yang, Shenzhen (CN); Peng Yang, Shenzhen (CN); Jun Zhang, Shenzhen (CN); Xiao Han, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 534 days.

(21) Appl. No.: 18/127,657

(22) Filed: Mar. 29, 2023

(65) Prior Publication Data

US 2023/0237771 A1     Jul. 27, 2023

Related U.S. Application Data

(63) Continuation of application No. PCT/CN2022/098805, filed on Jun. 15, 2022.

(30) Foreign Application Priority Data

Jul. 22, 2021    (CN) .......................... 202110831737.8

(51) Int. Cl.
   *G06V 10/77* (2022.01)
   *G06T 7/00* (2017.01)
(52) U.S. Cl.
   CPC ........ *G06V 10/7715* (2022.01); *G06T 7/0012* (2013.01); *G06T 2207/20081* (2013.01); *G06V 2201/031* (2022.01)

(58) Field of Classification Search
   None
   See application file for complete search history.

(56) References Cited

U.S. PATENT DOCUMENTS

| | | | | |
|---|---|---|---|---|
| 11,709,979 B1 * | 7/2023 | He | ......................... | G06N 3/096 |
| | | | | 703/2 |
| 12,299,050 B2 * | 5/2025 | Zhong | .................. | G06V 30/413 |

(Continued)

FOREIGN PATENT DOCUMENTS

| | | |
|---|---|---|
| CN | 109858563 A | 6/2019 |
| CN | 112507990 A | 3/2021 |

(Continued)

OTHER PUBLICATIONS

English Translation of WO2021059388A1, Yamaguchi et al., Date Accessed Sep. 12, 2025, Available online at https://patents.google.com/patent/WO2021059388A1/en?oq=wo+2021059388 . (Year: 2021).*

(Continued)

*Primary Examiner* — Tahmina N Ansari
(74) *Attorney, Agent, or Firm* — Morgan, Lewis & Bockius LLP

(57) ABSTRACT

The present application provides a self-supervised learning method performed by a computer device. The method includes: performing a data enhancement on an original medical image to obtain a first enhanced image and a second enhanced image, the first enhanced image and the second enhanced image being positive samples of each other; performing feature extractions on the first enhanced image and the second enhanced image by a feature extraction model to obtain a first image feature of the first enhanced image and a second image feature of the second enhanced image; determining a model loss of the feature extraction model based on the first image feature, the second image feature, and a negative sample image feature, the negative (Continued)

sample image feature being an image feature corresponding to other original medical images; and training the feature extraction model based on the model loss.

20 Claims, 13 Drawing Sheets

(56) References Cited

U.S. PATENT DOCUMENTS

| | | | | |
|---|---|---|---|---|
| 12,502,152 | B2 * | 12/2025 | Jiang | A61B 6/5217 |
| 2020/0183007 | A1 * | 6/2020 | Nagashima | G01S 17/93 |
| 2023/0024101 | A1 * | 1/2023 | de Haan | G05B 19/41885 |
| 2023/0025238 | A1 * | 1/2023 | Rudolph | G06N 3/0464 |
| 2023/0237771 | A1 * | 7/2023 | Wen | G06V 20/698 |
| | | | | 382/128 |
| 2023/0273318 | A1 * | 8/2023 | Wang | G06N 3/09 |
| | | | | 702/152 |
| 2024/0144646 | A1 * | 5/2024 | Sorakado | G06V 40/171 |
| 2024/0273720 | A1 * | 8/2024 | Yang | G06V 10/774 |
| 2025/0094837 | A1 * | 3/2025 | Malik | G06N 5/02 |
| 2025/0255568 | A1 * | 8/2025 | Jiang | A61B 6/5217 |
| 2025/0265788 | A1 * | 8/2025 | Hallgarten | G06F 3/013 |

FOREIGN PATENT DOCUMENTS

| | | |
|---|---|---|
| CN | 112766406 A | 5/2021 |
| CN | 113065533 A | 7/2021 |
| CN | 113822325 A | 12/2021 |
| WO | WO 2021059388 A1 | 4/2021 |

OTHER PUBLICATIONS

Jean-Bastien Grill et al., "Bootstrap Your Own Latent, A New Approach to Self-Supervised Learning", 34th Conference on Neural Information Processing Systems (NeurIPS 2020), Vancouver, Canada, Sep. 10, 2020, 14 pgs., Retrieved from the Internet: https://papers.nips.cc/paper/2020/file/f3ada80d5c4ee70142b17b8192b2958e-Paper.pdf.

Tencent Technology, ISR, PCT/CN2022/098805, Aug. 1, 2022, 3 pgs.

Tencent Technology, Extended European Search Report, EP Patent Application No. 22845039.1, Oct. 17, 2024, 13 pgs.

HeeJae Jun et al., "Combination of Multiple Global Descriptors for Image Retrieval", Computer Vision and Pattern Recognition, Apr. 2020, 10 pgs., Retrieved from the Internet: https://arxiv.org/abs/1903.10663.

Jonathan de Matos et al., "Machine Learning Methods for Histopathological Image Analysis: A Review", Special Issue 10th Anniversary of Electronics: Recent Advances in Computer Science & Engineering, vol. 10, Issue 5, DOI: 10.3390/electronics10050562, Feb. 2021, 42 pgs.

Kaiming He et al., "Momentum Contrast for Unsupervised Visual Representation Learning", Proceedings of the IEEE/CVF Conference on Computer Vision and Pattern Recognition (CVPR), Jun. 2020, 10 pgs., Retrieved from the Internet: https://openaccess.thecvf.com/content_CVPR_2020/html/He_Momentum_Contrast_for_Unsupervised_Visual_Representation_Learning_CVPR_2020_paper.html.

Mathilde Caron et al., "Deep Clustering for Unsupervised Learning of Visual Features", Proceedings of the European Conference on Computer Vision (ECCV), Jan. 2018, 18 pgs., Retrieved from the Internet: https://openaccess.thecvf.com/contentng_EECV_2018/html/Mathilde_Caron_Deep_Clustering_for_ECCV_2018_paper.html.

Olivier Dehaene et al., "Self-Supervision Closes the Gap Between Weak and Strong Supervision in Histology", Image and Video Processing, Dec. 2020, 15 pgs., Retrieved from the Internet: https://arxiv.org/abs/2012.03583.

Ozan Ciga et al., "Self-Supervised Contrastive Learning for Digital Histopathology", Machine Learning with Applications, DOI: 10.1016/j.mlwa.2021.100198, vol. 7, Nov. 2020, 37 pgs.

Phuc H. Le-Khac et al., "Contrastive Representation Learning: A Framework and Review", IEEE Access, vol. 8, DOI: 10.1109/ACCESS.2020.3031549, Oct. 2020, 30 pgs.

Wei Chen et al., "Deep Image Retrieval: A Survey", Leiden University, Scholarly Publications, Feb. 2021, 21 pgs., Retrieved from the Internet: https://arxiv.org/abs/2101.11282.

Tencent Technology, WO, PCT/CN2022/098805, Aug. 1, 2022, 5 pgs.

Tencent Technology, IPRP, PCT/CN2022/098805, Jan. 18, 2024, 6 pgs.

* cited by examiner

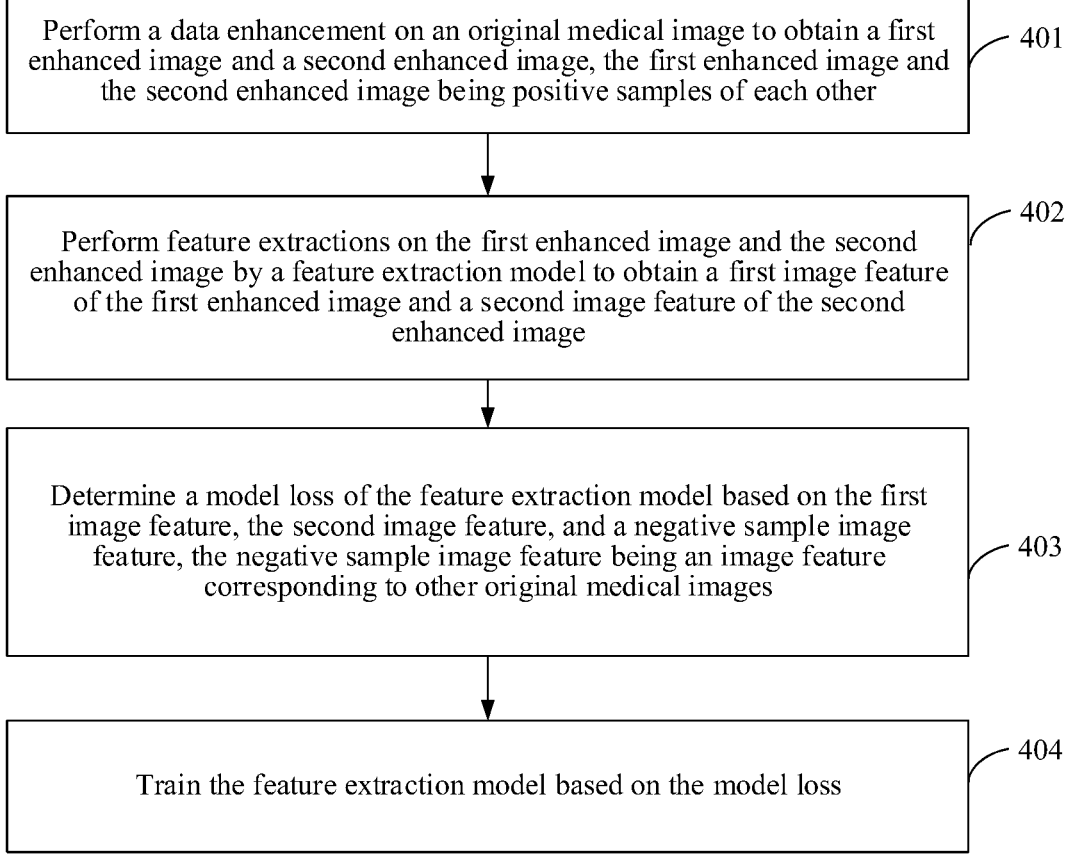

Perform a data enhancement on an original medical image to obtain a first enhanced image and a second enhanced image, the first enhanced image and the second enhanced image being positive samples of each other — 401

Perform feature extractions on the first enhanced image and the second enhanced image by a feature extraction model to obtain a first image feature of the first enhanced image and a second image feature of the second enhanced image — 402

Determine a model loss of the feature extraction model based on the first image feature, the second image feature, and a negative sample image feature, the negative sample image feature being an image feature corresponding to other original medical images — 403

Train the feature extraction model based on the model loss — 404

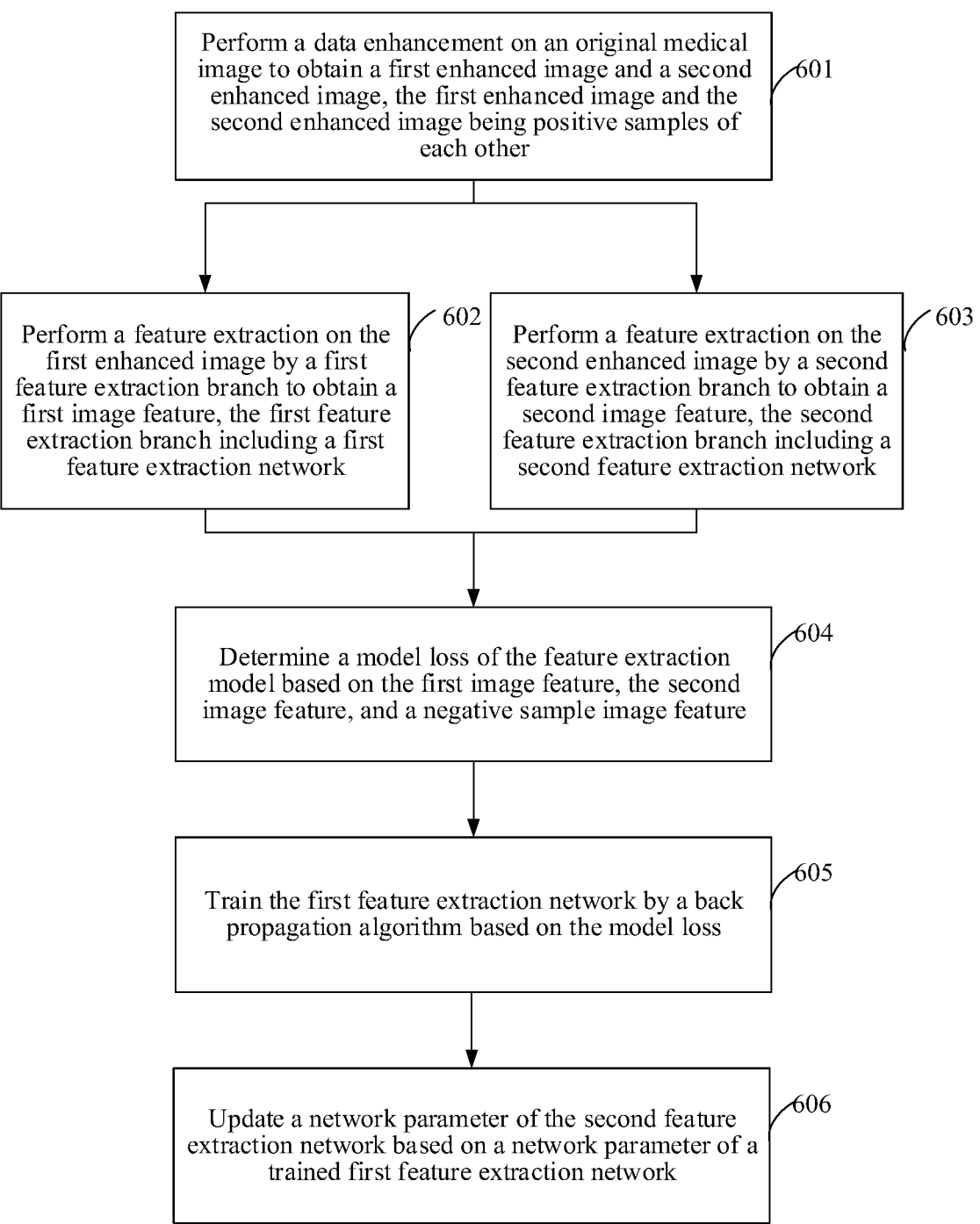

Perform a data enhancement on an original medical image to obtain a first enhanced image and a second enhanced image, the first enhanced image and the second enhanced image being positive samples of each other    601

Perform a feature extraction on the first enhanced image by a first feature extraction branch to obtain a first image feature, the first feature extraction branch including a first feature extraction network    602

Perform a feature extraction on the second enhanced image by a second feature extraction branch to obtain a second image feature, the second feature extraction branch including a second feature extraction network    603

Determine a model loss of the feature extraction model based on the first image feature, the second image feature, and a negative sample image feature    604

Train the first feature extraction network by a back propagation algorithm based on the model loss    605

Update a network parameter of the second feature extraction network based on a network parameter of a trained first feature extraction network    606

FIG. 6

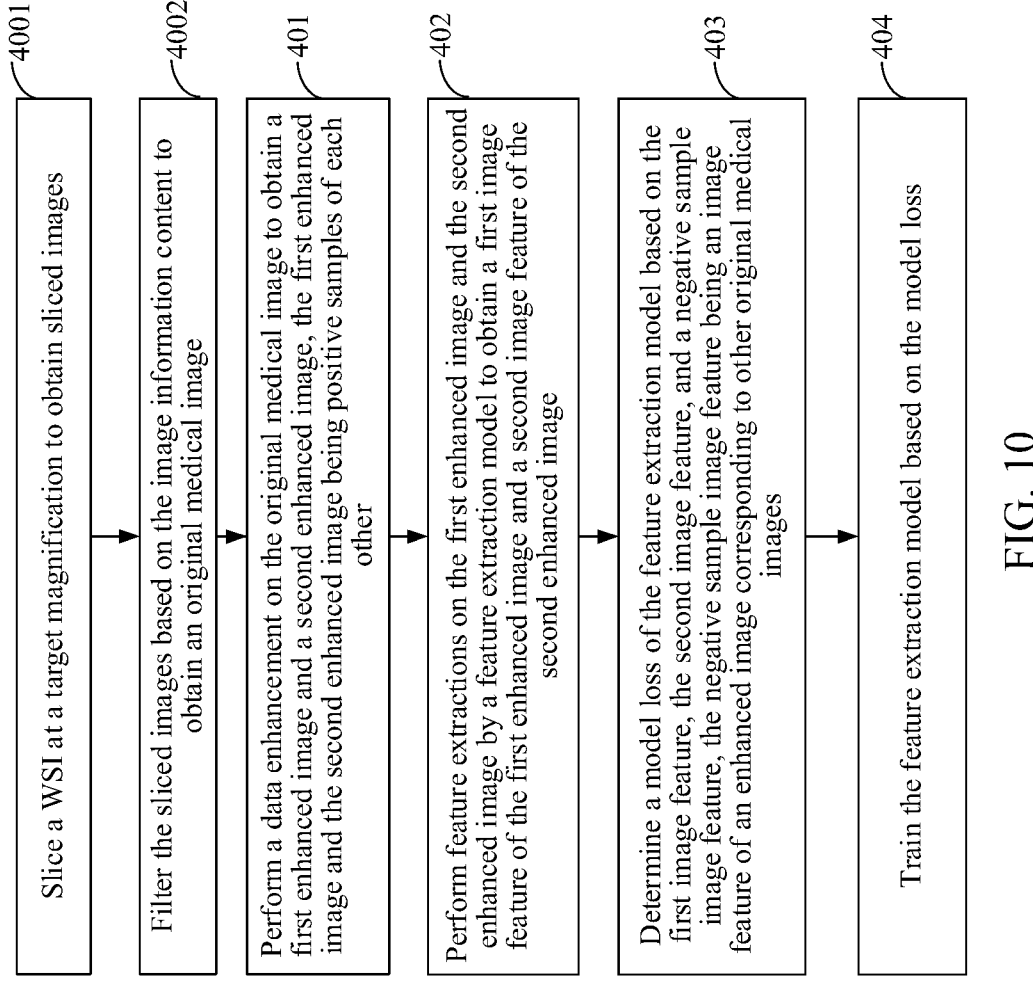

Slice a WSI at a target magnification to obtain sliced images — 4001

Filter the sliced images based on the image information content to obtain an original medical image — 4002

Perform a data enhancement on the original medical image to obtain a first enhanced image and a second enhanced image, the first enhanced image and the second enhanced image being positive samples of each other — 401

Perform feature extractions on the first enhanced image and the second enhanced image by a feature extraction model to obtain a first image feature of the first enhanced image and a second image feature of the second enhanced image — 402

Determine a model loss of the feature extraction model based on the first image feature, the second image feature, and a negative sample image feature, the negative sample image feature being an image feature of an enhanced image corresponding to other original medical images — 403

Train the feature extraction model based on the model loss — 404

FIG. 10

SELF-SUPERVISED LEARNING METHOD AND APPARATUS FOR PROCESSING MEDICAL IMAGING DATA

CROSS-REFERENCE TO RELATED APPLICATIONS

This application is a continuation application of PCT Patent Application No. PCT/CN2022/098805, entitled "SUPERVISED LEARNING METHOD AND APPARATUS FOR IMAGE FEATURES, DEVICE, AND STORAGE MEDIUM" filed on Jun. 15, 2022, which claims priority of Chinese Patent Application No. 202110831737.8 entitled "SUPERVISED LEARNING METHOD AND APPARATUS FOR IMAGE FEATURES, DEVICE, AND STORAGE MEDIUM", filed on Jul. 22, 2021, the entire contents of which are incorporated herein by reference.

FIELD OF THE TECHNOLOGY

Embodiments of this application relate to the field of artificial intelligence, and particularly to a self-supervised learning method and apparatus for image features, a device, and a storage medium.

BACKGROUND OF THE DISCLOSURE

As an important branch of the field of artificial intelligence, computer vision (CV) technology is widely used in medical image processing scenes, such as medical image recognition (recognizing the categories of tissues and organs in medical images), medical image retrieval (retrieving detailed medical images from databases), and medical image segmentation (segmenting the tissue structures in medical images).

As an important part of image processing, an image feature extraction directly affects the final image processing results. In the related art, a feature extraction is performed on a medical image by training a feature extraction model, and then a subsequent image processing flow is performed based on the extracted image feature. In one model training mode, when the supervised learning method is used for model training, the annotation information of sample medical images is usually used as the supervision for model training. However, since a large number of samples need to be used in the model training process, manual annotation of sample medical images takes a lot of time, resulting in a low model training efficiency.

SUMMARY

Embodiments of this application provide a self-supervised learning method and apparatus for image features, a device, and a storage medium, which can achieve self-supervised learning of image features without manual annotation, thereby improving a model training efficiency. The technical solution is as follows.

In one aspect, embodiments of this application provide a self-supervised learning method for image features, the method being performed by a computer device and including:

performing a data enhancement on an original medical image to obtain a first enhanced image and a second enhanced image, the first enhanced image and the second enhanced image being positive samples of each other;

performing feature extractions on the first enhanced image and the second enhanced image by a feature extraction model to obtain a first image feature of the first enhanced image and a second image feature of the second enhanced image;

determining a model loss of the feature extraction model based on the first image feature, the second image feature, and a negative sample image feature, the negative sample image feature being an image feature corresponding to other original medical images; and training the feature extraction model based on the model loss.

In another aspect, embodiments of this application provide a self-supervised learning apparatus for image features, the apparatus comprises:

a data enhancement module, configured to perform a data enhancement on an original medical image to obtain a first enhanced image and a second enhanced image, the first enhanced image and the second enhanced image being positive samples of each other;

a feature extraction module, configured to perform feature extractions on the first enhanced image and the second enhanced image by a feature extraction model to obtain a first image feature of the first enhanced image and a second image feature of the second enhanced image;

a loss determining module, configured to determine a model loss of the feature extraction model based on the first image feature, the second image feature, and a negative sample image feature, the negative sample image feature being an image feature corresponding to other original medical images; and a first training module, configured to train the feature extraction model based on the model loss.

In another aspect, embodiments of this application provide a computer device including a processor and a memory having stored therein at least one instruction, the at least one instruction being loaded and performed by the processor to implement the self-supervised learning method for image features as the above aspects.

In another aspect, embodiments of this application provide a computer-readable storage medium having stored therein at least one instruction, the at least one instruction being loaded and performed by the processor to implement the self-supervised learning method for image features as the above aspects.

In another aspect, embodiments of this application provide a computer program product or computer program including a computer instruction, the computer instruction being stored in a computer-readable storage medium. The processor of the computer device reads the computer instruction from the computer-readable storage medium, and the processor performs the computer instructions to cause the computer device to perform the self-supervised learning method for image features provided in the above aspects.

In the embodiments of this application, the first enhanced image and the second enhanced image being positive samples of each other are obtained by performing the data enhancement on the original medical image. The first image feature and the second image feature are obtained by performing feature extractions by the feature extraction model. Then other original medical images being different from the original medical image are taken as the negative sample. The model loss of the feature extraction model is determined based on the first image feature, the second image feature, and the negative sample image feature, and finally the feature extraction model is trained using the model loss. In the whole process, the self-supervised learning is used to enable the feature extraction model learn the image features of the medical image, without manual annotation on the medical image, which reduces the cost of manual annotation in the model training process and improves the training efficiency of the feature extraction model.

BRIEF DESCRIPTION OF THE DRAWINGS

FIG. 4 is a flowchart of a self-supervised learning method for image features provided by an exemplary embodiment of this application.

FIG. 6 is a flowchart of a self-supervised learning method for image features provided by another exemplary embodiment of this application.

FIG. 10 is a flowchart of a self-supervised learning method for image features provided by another exemplary embodiment of this application.

DESCRIPTION OF EMBODIMENTS

Computer vision is a science that studies how to make a machine "see". More specifically, it refers to machine vision that cameras and computers are used instead of human eyes to identify, track, and measure targets, and further performs graphics processing to make the computer process into images more suitable for human eyes to observe or transmit to the instrument for detection. As a scientific discipline, computer vision studies related theories and techniques attempt to establish artificial intelligence systems capable of obtaining information from images or multidimensional data. Computer vision technologies generally include technologies, such as image processing, image recognition, image semantic understanding, image retrieval, optical character recognition (OCR), video processing, video semantic understanding, video content/behavior recognition, three-dimensional object reconstruction, 3D technology, virtual reality, augmented reality, synchronous positioning and map construction, automatic driving, intelligent transportation, and also include common biological feature recognition technologies such as face recognition and fingerprint recognition.

An image feature extraction is an important step to achieve specific functions, and the quality of the extracted image features will directly affect the quality of the achievement of functions. For example, when performing image recognition, the extracted high-quality image features help to improve the accuracy of subsequent image recognition; when performing image retrieval, the extracted high-quality image features help to improve the comprehensiveness of retrieval results and reduce the probability of retrieving irrelevant results.

In the related art, a self-supervised model training method is usually used to train a feature extraction model so as to perform an image feature extraction using the feature extraction model obtained from the training. However, before the self-supervised model training, a large number of sample images containing labeled information need to be prepared in advance so as to subsequently perform the model training using the labeled information as the supervision. For example, when the feature extraction model and a classification model are combined to realize an image classification function, a sample image used for model training needs to contain a type tag; when the feature extraction model and a segmentation model are combined to realize image segmentation function, the sample image used for model training needs to contain object segmentation information. However, manual annotation of sample images takes a lot of time, and the cost of annotation is high, resulting in a low training efficiency of the feature extraction model.

Figure 1:
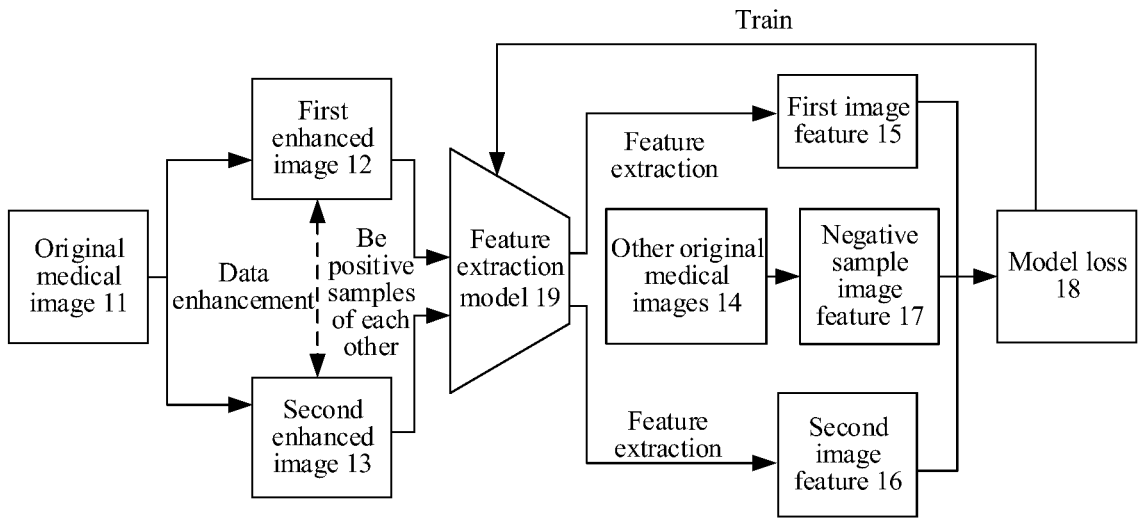
FIG. 1 is a schematic diagram of a self-supervised learning method for image features shown in an exemplary embodiment of this application.

In order to reduce the reliance on manual annotation while ensuring the quality of the feature extraction, so as to improve a model training efficiency, embodiments of this application provide a self-supervised learning method for image features. As shown in FIG. 1, a computer device uses a data enhancement technique to obtain a first enhanced image 12 and a second enhanced image 13 being positive samples of each other based on an original medical image 11, and takes other original medical images 14 being different from the original medical image 11 as a negative sample, so as to determine a model loss 18 based on image features of the first enhanced image 12, the second enhanced image 13, and the negative sample (including a first image feature 15, a second image feature 16, and a negative sample image feature 17), and then trains a feature extraction model 19 using the model loss 18. In the whole model training process, without manual annotation, the computer device can achieve self-supervised feature learning only with the help of original medical images, which helps to reduce the cost of sample preparation in the early stage of model training and improve the model training efficiency.

The feature extraction model trained by using the scheme provided by the embodiments of this application may be configured to extract image features of a medical image, and the extracted image features may be used for tasks such as medical image classification and similar medical image retrieval.

Figure 2:
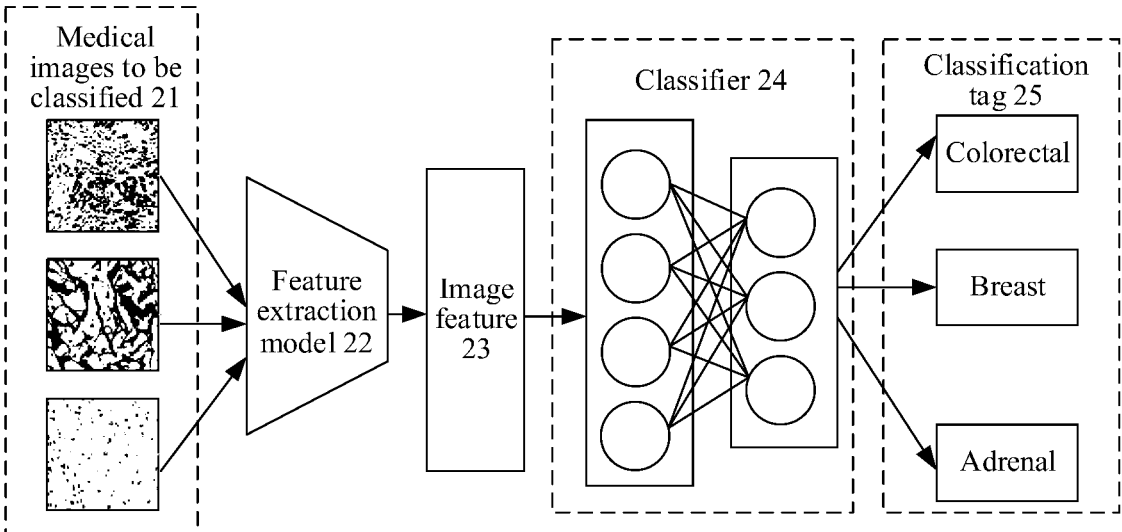
FIG. 2 is a schematic diagram of an implementation of a medical image classification scene shown in an exemplary embodiment of this application.

In a possible application scenario, as shown in FIG. 2, after inputting medical images to be classified 21 into a pre-trained feature extraction model 22, an image feature 23 of the medical images to be classified 21 can be obtained. The image feature 23 is input into a pre-trained classifier 24. The classifier 24 performs image classification according to the image feature 23, and finally outputs a classification tag 25 corresponding to the medical images to be classified 21.

Figure 3:
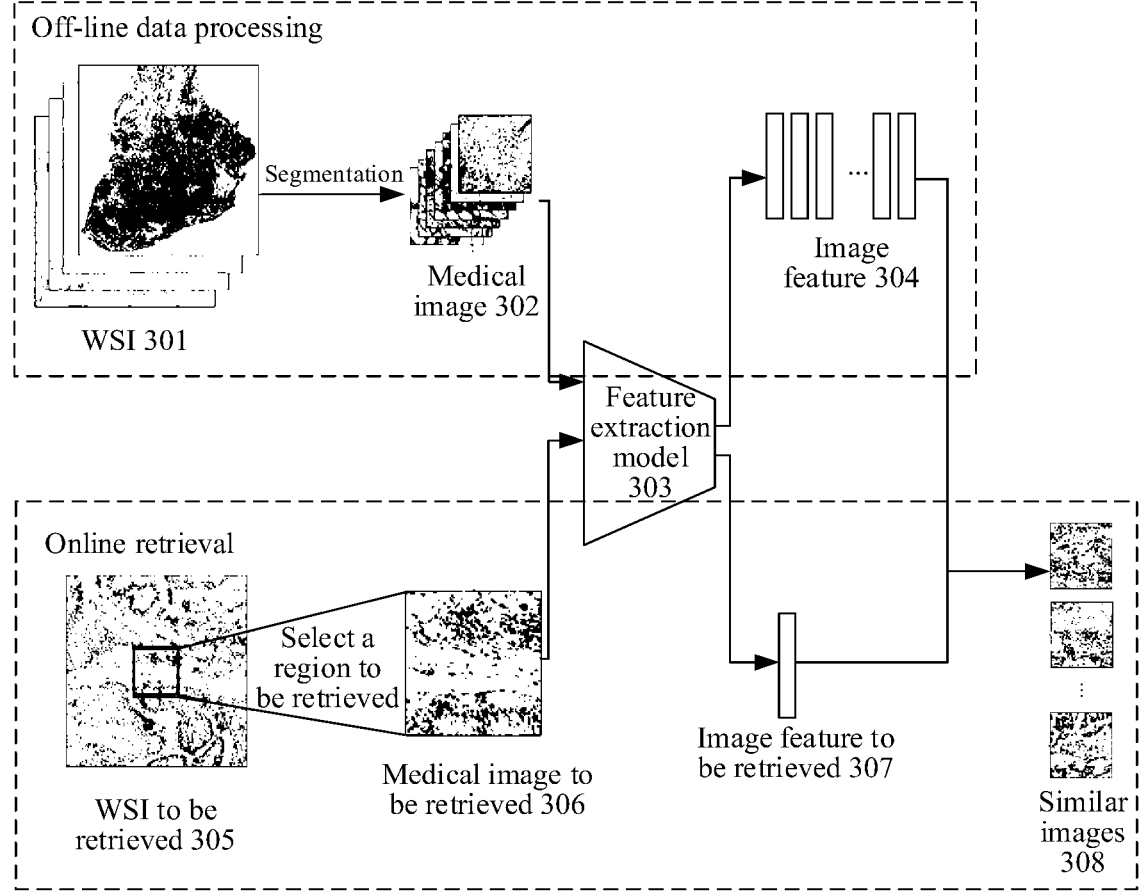
FIG. 3 is a schematic diagram of an implementation of a medical image retrieval scene shown in an exemplary embodiment of this application.

In another possible application scenario, as shown in FIG. 3, in an off-line data processing stage, the computer device firstly divides a whole slide image (WSI) 301 to obtain small-sized medical images 302, and performs a feature extraction on each medical image 302 using a pre-trained feature extraction model 303 to obtain image features 304 of each medical image 302, and constructs a medical image feature database based on the image features 304. In an online retrieval stage, a user selects a retrieval region for a WSI 305 to be retrieved to obtain a medical image to be retrieved 306, and performs a feature extraction on the medical image to be retrieved 306 using the pre-trained feature extraction model 303 to obtain an image feature to be retrieved 307, so as to perform feature matching on the image feature to be retrieved 307 and the image features 304 in the medical image feature database, and then determines medical images 302 with a feature matching degree higher than a threshold value as similar images 308.

The above-mentioned application scenarios are merely illustrative, and the feature extraction model trained by using the scheme provided by the embodiments of this application may also be configured to other scenes using the image feature, such as abnormal tissue region division in the medical image, and the embodiments of this application are not limited thereto.

Furthermore, the self-supervised learning method for image features provided by the embodiments of this application may be used in the computer device for training the feature extraction model. The computer device can be a personal computer, a workstation, a physical server, a cloud server, or the like, and for the convenience of presentation, the following embodiments take the method being performed by the computer device as an example to describe.

FIG. 4 illustrates a flowchart of a self-supervised learning method for image features provided by an exemplary embodiment of this application. This embodiment takes the method being performed by the computer device as an example to describe, and the method includes the following steps.

Step 401: Perform a data enhancement on the original medical image to obtain the first enhanced image and the second enhanced image, the first enhanced image and the second enhanced image being positive samples of each other.

The target of training the feature extraction model using the self-supervised learning is to reduce the distance of similar medical images in a feature encoding space and increase the distance of dissimilar images in the feature encoding space, so that the model has an ability to distinguish image similarity. Therefore, how to determine the similarity between input images in the model training process and a correct guidance based on the model have become the key of self-supervised learning. In the embodiments of this application, the first enhanced image and the second enhanced image which are similar but not identical are obtained by performing different degrees or modes of data enhancements on the original medical image, and accordingly, the image features of the first enhanced image and the second enhanced image have a high degree of similarity but are not identical.

In one possible implementation, in conjunction with the image features of the medical image, the computer device may perform the data enhancement in color (since the medical image is a stained sample of a microscopic tissue section, the degree of staining may vary) and direction (since the tissue section may be angled in any direction under a microscope, the medical image is not sensitive to a display direction). Color enhancement is used for changing a luminosity of an image, thereby enhancing the robustness of the image in a color gamut. Direction enhancement is used for changing the angle or orientation of the image, thereby reducing sensitivity to the display direction of the image.

In some embodiments, a method for performing the color enhancement on the image by the computer device may be described as: $I_c \leftarrow a_c \cdot I_c + b_c$, where $a_c \sim \mathcal{U}([0.9, 1.1])$, $b_c \sim \mathcal{U}([-10, +10])$, where $I_c$ represents the lightness of each pixel point in the original medical image, $a_c$ and $b_c$ are adjustment coefficients, and $\mathcal{U}$ is a numerical range of the adjustment coefficient.

When the computer device performs direction enhancement on the image, the original medical image may be subjected to processing such as random angle rotation, random flip mirror image, and this embodiment is not limited thereto.

In some embodiments, the computer device performs a color enhancement and a direction enhancement on the original medical image based on a first enhancement parameter to obtain the first enhanced image, and performs a color enhancement and a direction enhancement on the original medical image by a second enhancement parameter to obtain the second enhanced image, the first enhancement parameter and the second enhancement parameter being different.

For example, in the first enhancement parameter, $a_c = 0.9$, $b_c = -5$, and a rotation angle is $+25°$. In the second enhancement parameter, $a_c = 1.05$, $b_c = +5$, and the rotation angle is $-25°$.

Of course, in addition to performing a data enhancement on the image from the above-mentioned dimensions, the computer device may also perform the data enhancement on the image from other dimensions, and the embodiments of this application are not limited thereto.

Furthermore, considering that medical images have a strong distance correlation on a physical scale, i.e., medical images that are physically close to each other have a similarity, in other possible implementations, the computer device determines that two medical images having a distance less than a distance threshold are positive samples of each other, further increasing the number of positive samples. The distance threshold is related to a resolution of the medical image, for example, at 10 times magnification, the distance threshold is 100 pixels.

Figure 5:
FIG. 5 is a medical image being positive samples of each other shown in an exemplary embodiment.

Illustratively, as shown in FIG. 5, the computer device determines that a first medical image 51 of a first region and a second medical image 52 of a second region are positive samples of each other in the same WSI.

Step 402: Perform feature extractions on the first enhanced image and the second enhanced image by the feature extraction model to obtain the first image feature of the first enhanced image and the second image feature of the second enhanced image.

Further, the computer device separately inputs the first enhanced image and the second enhanced image into the feature extraction model, and performs feature extractions by the feature extraction model to obtain the first image feature and the second image feature. The first image feature and the second image feature are represented by a feature map, and the feature extraction model may be a model with a residual network (ResNet), a ResNeXt, and a vision transformer (ViT) as a backbone network, and the backbone network used by the feature extraction model is not limited in the embodiments of this application.

Step 403: Determine a model loss of the feature extraction model based on the first image feature, the second image feature, and a negative sample image feature, the negative sample image feature being an image feature corresponding to other original medical images.

In the model training process, in addition to using the first enhanced image and the second enhanced image being positive samples of each other, the computer device also needs to introduce negative samples that are not similar to the first enhanced image and the second enhanced image, so that the feature extraction model can learn the difference of image features between dissimilar images.

In one possible implementation, the computer device takes other original medical images different from the current original medical image as a negative sample of the current original medical image, and then the other original medical images or the enhanced images corresponding to the other original medical images as a negative sample of the first enhanced image and the second enhanced image.

In some embodiments, if the other original medical images are taken as the negative sample of the first enhanced image and the second enhanced image, the negative sample image feature is an image feature extracted from the other original medical images. If the enhanced images corresponding to the other original medical images are taken as the negative sample of the first enhanced image and the second enhanced image, the negative sample image feature is an image feature extracted from the enhanced images corresponding to the other original medical images. In addition, generation modes of the enhanced images corresponding to the other original medical images may also use the above-mentioned modes, such as color enhancement, direction enhancement, and this application is not limited thereto.

In some embodiments, the current original medical image and the other original medical images are different images belonging to the same training batch, and the other original medical images undergo the data enhancement and the feature extraction prior to the current original medical image.

In some embodiments, the computer device determines the loss of the feature extraction model based on a feature difference between the first image feature and the second image feature and a feature difference between the first image feature (or the second image feature) and the negative sample image feature. The feature difference between image features may be represented by a feature distance, and the feature distance may be a Euclidean distance, a Manhattan distance, a cosine distance, and the like, and this embodiment is not limited thereto.

Step 404: Train the feature extraction model based on the model loss.

Further, the computer device takes minimizing the model loss as a training target, i.e., narrowing the feature difference between the first image feature and the second image feature, enlarging the feature difference between the first image feature (or the second image feature) and the negative sample image feature, and training the feature extraction model until the training is finished when a training completion condition is satisfied. The training completion condition includes at least one of a loss convergence or reaching a number of training rounds.

In summary, in the embodiments of this application, the first enhanced image and the second enhanced image being positive samples of each other are obtained by performing the data enhancement on the original medical image. The first image feature and the second image feature are obtained by performing feature extractions by the feature extraction model. Then other original medical images being different from the original medical image are taken as the negative sample. The model loss of the feature extraction model is determined based on the first image feature, the second image feature, and the negative sample image feature, and finally the feature extraction model is trained using the model loss. In the whole process, the self-supervised learning is used to enable the feature extraction model learn the image features of the medical image, without manual annotation on the medical image, which reduces the cost of manual annotation in the model training process and improves the training efficiency of the feature extraction model.

In one possible implementation, in order to avoid using the same feature extraction network to perform feature extractions on the first enhanced image and the second enhanced image, and outputting the same feature extraction result so as to lead to a collapsed solution, the feature extraction model in the embodiments of this application includes two feature extraction branches, so that different feature extraction branches are used for performing feature extractions on different enhanced images, and the different feature extraction branches use feature extraction networks with different parameters (i.e., weight values of the feature extraction networks are not shared). Illustrative embodiments are described below.

FIG. 6 illustrates a flowchart of a self-supervised learning method for image features provided by another exemplary embodiment of this application. This embodiment takes the method being performed by the computer device as an example to describe, and the method includes the following steps.

Step 601: Perform a data enhancement on the original medical image to obtain the first enhanced image and the second enhanced image, the first enhanced image and the second enhanced image being positive samples of each other.

An implementation of this step may be referred to step 401 above, and this embodiment will not be described again here.

Figure 7:
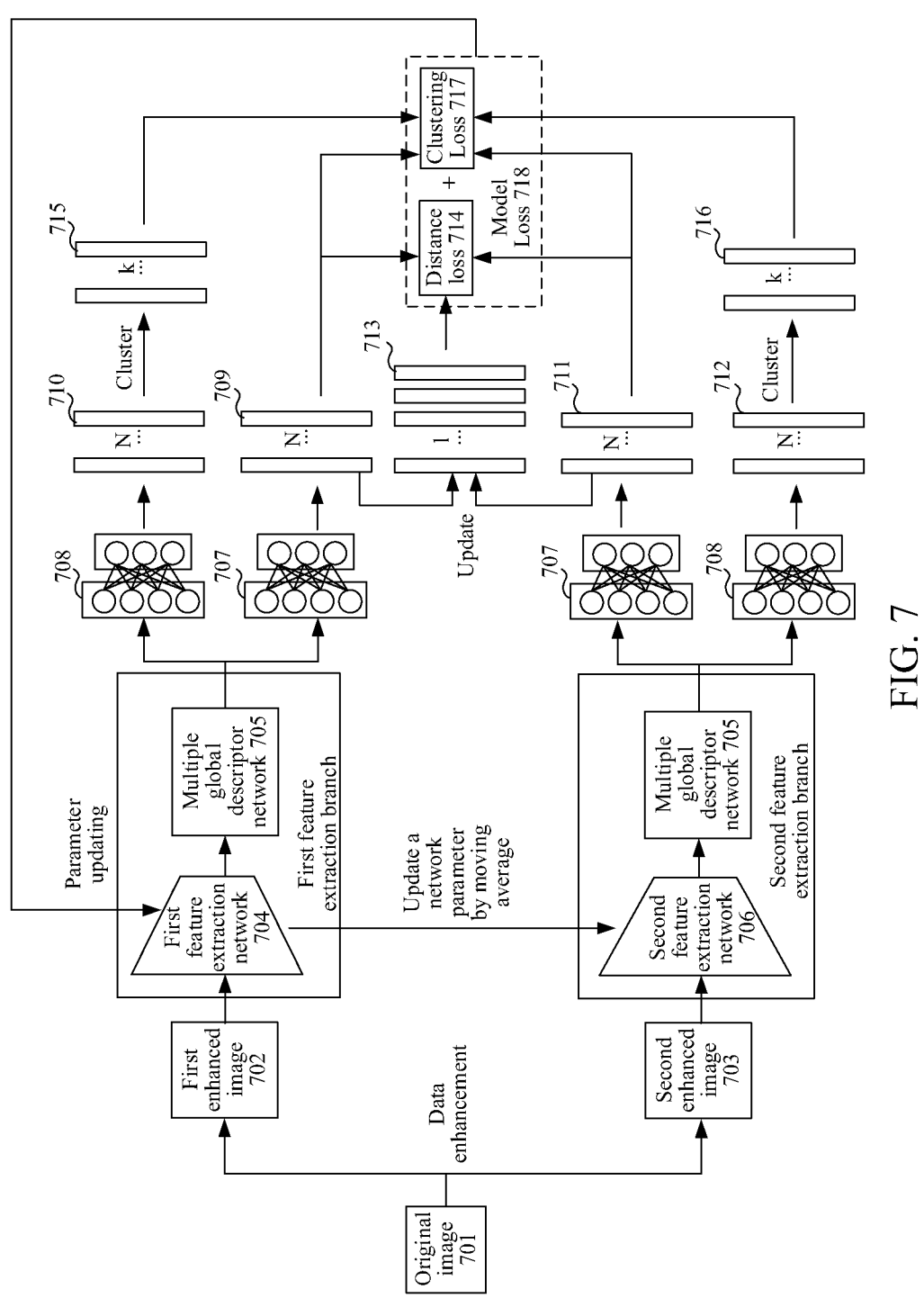
FIG. 7 is a schematic diagram of an implementation of an image feature self-supervised learning process shown in an exemplary embodiment of this application.

Illustratively, as shown in FIG. 7, after the computer device performs the data enhancement on an original image 701, the first enhanced image 702 and the second enhanced image 703 are obtained.

Step 602: Perform a feature extraction on the first enhanced image by a first feature extraction branch to obtain the first image feature, the first feature extraction branch including a first feature extraction network.

In one possible implementation, the first enhanced image of the first feature extraction branch is input, and the feature extraction is performed by the first feature extraction network of the first feature extraction branch to obtain the first image feature.

In general, after performing the feature extraction on the enhanced image, in order to reduce a feature dimension so as to reduce a calculation amount in a subsequent reasoning process, the computer device will perform pooling processing on the extracted image features, and common pooling modes include maximum pooling, average pooling and so on. However, since focuses under different pooling modes are different, for example, the maximum pooling focuses on a maximum value in a pooling region, and the average pooling focuses on an average value in the pooling region, in order to improve a feature expression of the image feature, in one possible implementation, a multiple global descriptor (MGD) network is also connected after the feature extraction network, and the MGD network is used for polymerizing and outputting image features (corresponding to different pooling modes) under different descriptors. This step may include the following steps.

1. Perform the feature extraction on the first enhanced image by the first feature extraction network to obtain a first intermediate image feature.

The computer device inputs the first enhanced image into the first feature extraction network to obtain a first intermediate image feature outputted by the network.

Illustratively, as shown in FIG. 7, the computer device inputs a first enhanced image 702 into the first feature extraction branch from which a first feature extraction network 704 performs the feature extraction to obtain the first intermediate image feature.

2. Perform at least two types of pooling on the first intermediate image feature by the MGD network to obtain at least two first global descriptors.

In some embodiments, the MGD network is composed of at least two pooling layers, and different pooling layers correspond to different pooling modes. After completing the feature extraction, the computer device performs pooling on the first intermediate image features by at least two pooling layers to obtain at least two first global descriptors.

In some embodiments, the pooling layers may include at least two of a global average pooling (GAP) layer, a global maximum pooling (GMP) layer, and a general average pooling (GeAP) layer. Of course, the computer device may perform pooling on the intermediate image feature using other pooling modes, and this embodiment is not limited thereto.

Figure 8:
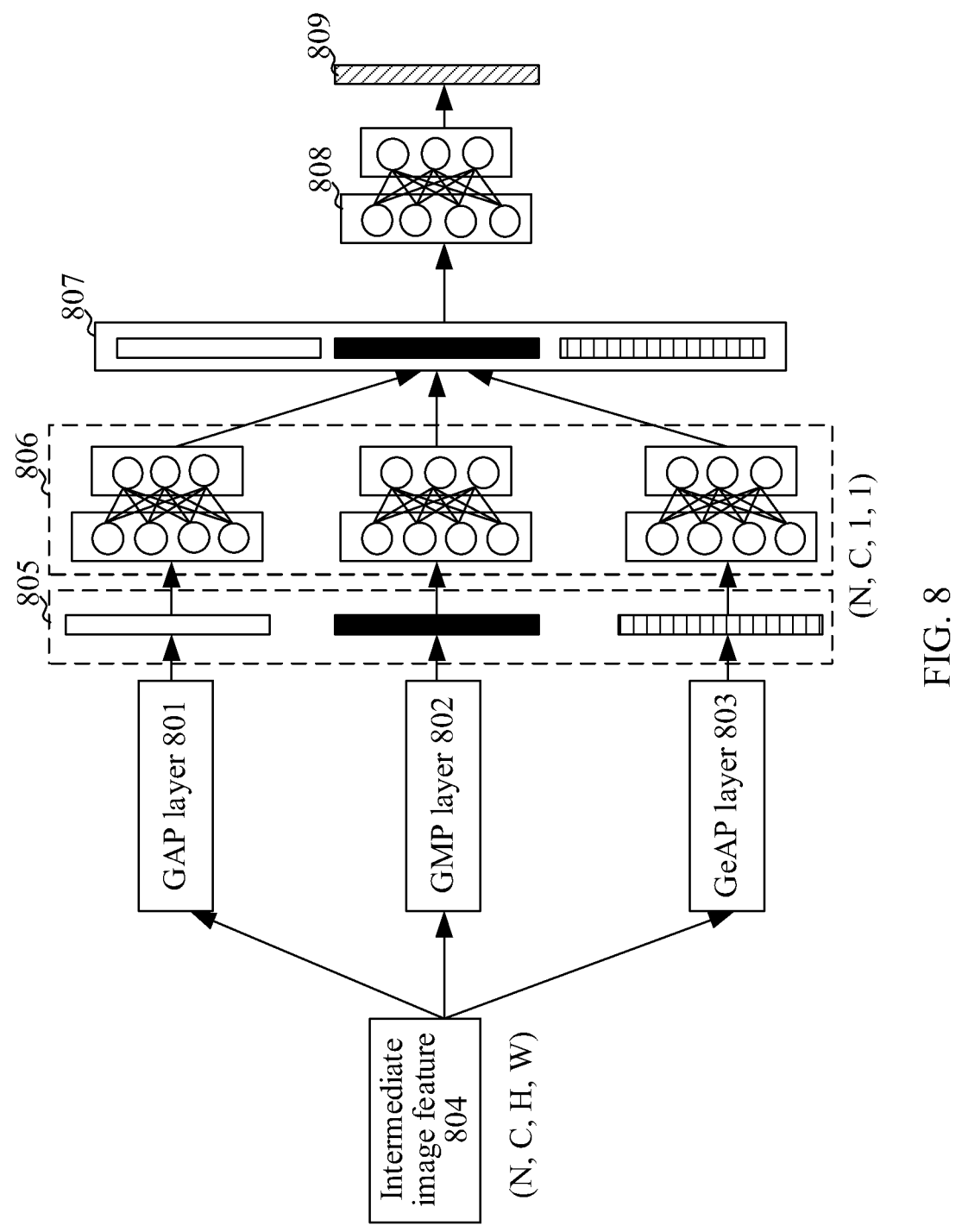
FIG. 8 is a schematic diagram of a multiple global descriptor network shown in an exemplary embodiment of this application.

Illustratively, as shown in FIG. 8, the MGD network is provided with a GAP layer 801, a GMP layer 802, and a GeAP layer 803, and the intermediate image feature 804 outputted by the feature extraction network is inputted into the GAP layer 801, the GMP layer 802, and the GeAP layer 803 to obtain three different pooled global descriptors 805. A dimension of the intermediate image feature is (N, C, H, W), a dimension of the global descriptor is (N, C, 1, 1). N is a number of enhanced images, C is a number of channels, H is a height of the feature map, and W is a width of the feature map.

3. Cascade at least two the first global descriptors by the MGD network, and generate the first image feature based on the cascaded first global descriptors.

In some embodiments, a multilayer perceptron (MLP) is connected after each pooling layer. The computer device further processes the pooled first global descriptor by the MLP, and cascades at least two processed first global descriptors, and finally inputs the cascaded first global descriptor into the MLP to obtain the first image feature of the first enhanced image.

Illustratively, as shown in FIG. 8, the computer device inputs the global descriptor 805 into an MLP 806, and cascades the output result of each MLP 806 to obtain a cascade global descriptor 807, and finally processes the cascade global descriptor 807 by an MLP 808 to obtain a first image feature 809.

Step 603: Perform the feature extraction on the second enhanced image by a second feature extraction branch to obtain the second image feature, the second feature extraction branch including a second feature extraction network.

Similar to the first feature extraction branch, the second feature extraction branch includes the second feature extraction network and the MGD network. The weight values of the second feature extraction network and the first feature extraction network are not shared, and the MGD networks in the two feature extraction branches are consistent. In one possible implementation, this step may include the following steps.

1. Perform the feature extraction on the second enhanced image by the first feature extraction network to obtain a second intermediate image feature.

The computer device inputs the second enhanced image into the second feature extraction network to obtain a second intermediate image feature outputted by the network.

2. Perform at least two types of pooling on the second intermediate image feature by the MGD network to obtain at least two global descriptors.

After completing the feature extraction, the computer device performs pooling on the second intermediate image features by at least two pooling layers to obtain at least two second global descriptors.

3. Cascade at least two the second global descriptors by the MGD network, and generate the second image feature based on the cascaded second global descriptors.

The computer device performs further on the second global descriptor obtained after the pooling by the MLP, and cascades at least two second global descriptors after the processing, and finally inputs the cascaded second global descriptor into the MLP to obtain the second image feature of the second enhanced image.

A process of performing the feature extraction using the second feature extraction branch may refer to step 602, and this embodiment will not be described again here.

Illustratively, as shown in FIG. 7, the computer device performs the feature extraction on the first enhanced image 702 by the first feature extraction network 704 and a MGD network 705 in the first feature extraction branch to obtain the first image feature. The feature extraction is performed on the second enhanced image 703 by a second feature extraction network 706 and a MGD network 705 in the second feature extraction branch to obtain the second image feature.

Step 604: Determine the model loss of the feature extraction model based on the first image feature, the second image feature, and the negative sample image feature.

Since a feature extraction target of the feature extraction model is to reduce the feature distance between similar images and enlarge the feature distance between dissimilar images, in this embodiment, the model loss of the feature extraction model includes a distance loss, and the distance loss is obtained by determining a positive sample feature distance and a negative sample feature distance. The positive sample feature distance is the feature distance between the first image feature and the second image feature, and the negative sample feature distance is the feature distance between the first image feature (or the second image feature) and the negative sample image feature. The positive sample feature distance has a positive correlation with the distance loss, and the negative sample feature distance has a negative correlation with the distance loss.

Although the model training based on a model loss containing the distance loss can reduce the feature distance between similar images and enlarge the feature distance between dissimilar images, there is a problem that the number of positive samples is too small, i.e., each original medical image is considered as an independent class, and the model training based on the distance loss enlarges distances between all classes. However, simply enlarging a sample-to-sample distance may cause learning difficulties and even bring a problem of false negative samples. To avoid the above-mentioned problems, in the embodiments of this application, the model loss of the feature extraction model includes a clustering loss in addition to the distance loss, thereby generating better cohesion of similar images.

In a mode for determining the clustering loss, the computer device clusters the first image features corresponding to each original medical image in the current training batch to obtain k first class cluster centroids, k being an integer greater than or equal to 2, and clusters the second image features corresponding to each original medical image in the current training batch to obtain k second class cluster centroids. The clustering loss is determined based on a distance between the first image feature and the k second class cluster centroids and a distance between the second image feature and the k first class cluster centroids.

The computer device may use clustering algorithms such as K-Means clustering and mean shift clustering to determine a class cluster centroid, and the class cluster centroid may be represented by an average feature of each image feature in the same class cluster, and this embodiment is not limited thereto.

However, because there is a certain confronting relationship between the distance loss and the clustering loss, directly using the first image features and the second image features for clustering may cause learning difficulties in the subsequent training process. In order to avoid the above-mentioned problems, in another possible implementation, the computer device generates a first target feature and a second target feature corresponding to the original medical image based on the first image feature, and generates a third target feature and a fourth target feature corresponding to the original medical image based on the second image feature, thereby determining the distance loss and the clustering loss using different target features.

In some embodiments, each feature extraction branch also includes a first MLP and a second MLP. The computer device inputs the first image feature into the first MLP and the second MLP to obtain the first target feature and the second target feature, and inputs the second image feature into the first MLP and the second MLP to obtain the third target feature and the fourth target feature.

Illustratively, as shown in FIG. 7, the computer device processes the first image feature by a first MLP 707 to output a first target feature 709, and processes the first image feature by a second MLP 708 to output a second target feature 710. The computer device processes the second image feature by the first MLP 707 to output a third target feature 711, and processes the second image feature by the second MLP 708 to output a fourth target feature 712.

Figure 9:
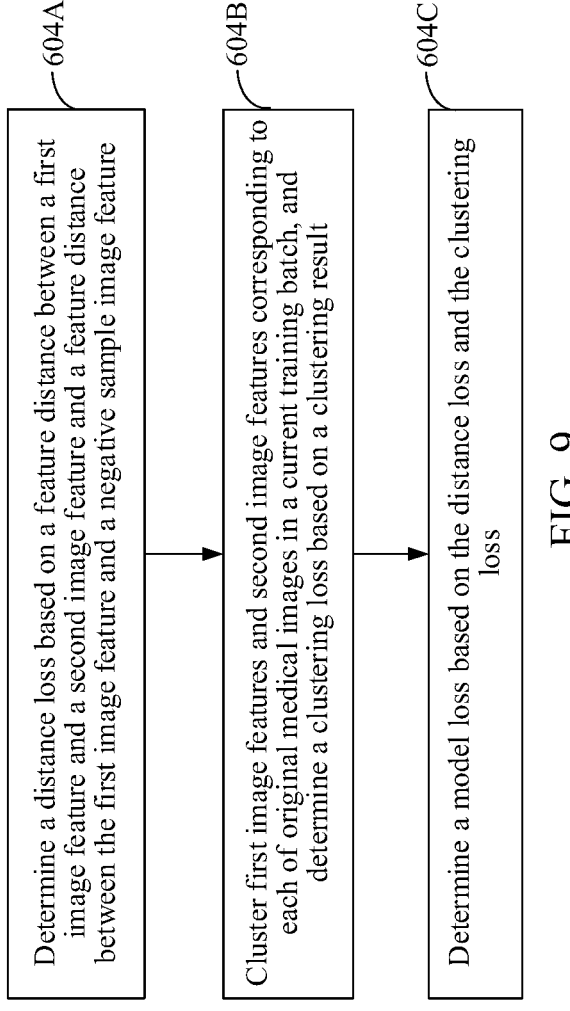
FIG. 9 is a flowchart of a model loss determination process shown in an exemplary embodiment of this application.

In one possible implementation, as shown in FIG. 9, the process of determining the model loss may include the following sub-steps.

Step 604A: Determine the distance loss based on the feature distance between the first image feature and the second image feature and a feature distance between the first image feature and the negative sample image feature.

In one possible implementation, the computer device determines the distance loss using target features outputted by the same MLP. In some embodiments, the computer device determines the distance loss based on a feature distance between the first target feature and the third target feature and a feature distance between the first target feature (or the second target feature) and the negative sample image feature.

In some embodiments, the computer device is provided with a negative sample image feature queue containing image features of the 1 most recently inputted original image, and the negative sample image feature queue may be represented as $M=\{m_0, m_1, \ldots, m_{l-1}\}$. Since each original image appears only once in each round of training, the image features in the negative sample image feature queue are data enhancements from different input images.

In some embodiments, the computer device obtains the distance loss by calculation by infoNCE, and the distance loss may be represented as:

$$L_q = -\log \frac{\exp(f(x_1) \cdot f(x_2)/t)}{\sum_i^l \exp(f(x_i) \cdot m_i/t) + \exp(f(x_1) \cdot f(x_2)/t)}$$

l is a number of the negative sample image features, $f(x_1)$ represents the first target feature, $f(x_2)$ represents the third target feature, $m_i$ is the i-th negative sample image feature, and t is a hyper-parameter for controlling the smoothness of a loss function.

Illustratively, as shown in FIG. 7, the computer device obtains a distance loss 714 by calculation based on the first target feature 709, the third target feature 711, and a negative sample image feature 713.

Step 604B: Cluster first image features and second image features corresponding to each original medical image in the current training batch, and determine the clustering loss based on a clustering result.

To avoid learning difficulties, when the computer device performs feature clustering on image features, target features outputted by another MLP are clustered, and the clustering loss is determined based on the clustering result. In one possible implementation, determining the clustering loss may include the following steps.

1. Cluster the second target features corresponding to each original medical image in the current training batch to obtain k third class cluster centroids.

In some embodiments, the computer device clusters the second target features corresponding to each original medical image in the current training batch to obtain k class clusters, and determines the third class cluster centroid based on the second target features in each class cluster.

Illustratively, as shown in FIG. 7, the computer device clusters second target features 710 corresponding to N original medical images to obtain k third class cluster centroids 715.

2. Cluster the fourth target features corresponding to each original medical image in the current training batch to obtain k fourth class cluster centroids.

In some embodiments, the computer device clusters the fourth target features corresponding to each original medical image in the current training batch to obtain k class clusters, and determines the fourth class cluster centroid based on the fourth target features in each cluster.

Illustratively, as shown in FIG. 7, the computer device clusters fourth target features 712 corresponding to N original medical images to obtain k fourth class cluster centroids 716.

3. Determine the clustering loss based on a distance between the first target feature and k fourth class cluster centroids and a distance between the third target feature and k third class cluster centroids.

In some embodiments, the clustering loss includes an infoNCE between a class cluster centroid corresponding to the first enhanced image and a target feature corresponding to the second enhanced image, and an infoNCE (i.e., a symmetry loss) between a class cluster centroid corresponding to the second enhanced image and a target feature corresponding to the first enhanced image. The computer device takes a class cluster centroid of the class cluster to which the target feature belongs as the positive sample, and takes the class cluster centroids of other class clusters as the negative sample, determines a distance between the target feature and the class cluster centroid, and then obtains the clustering loss.

Illustratively, the clustering loss may be represented as:

$$L_C = -\log \frac{\exp\left(f(x_1) \cdot C(x_2)_j \big/ t\right)}{\sum_{i, i \neq j}^{k} \exp\left(f(x_i) \cdot C(x_2)_i / t\right) + \exp\left(f(x_1) \cdot C(x_2)_j / t\right)},$$

where $f(x_1) \in C(x_2)_j$ k is a number of the fourth class cluster centroids, $f(x_1)$ represents the first target feature, $C(x_2)$ represents the fourth class cluster centroid, $f(x_1) \in C(x_2)_j$ represents that the first target feature belongs to a class cluster corresponding to a j-th fourth class cluster centroid, and t is the hyper-parameter for controlling the smoothness of the loss function.

Illustratively, as shown in FIG. 7, the computer device obtains a clustering loss 717 by calculation based on the first target feature 709, the third target feature 711, the third class cluster centroid 715, and the fourth cluster centroid 716.

Step 604C: Determine the model loss according to the distance loss and the clustering loss.

Illustratively, as shown in FIG. 7, the computer device determines a sum of the distance loss 714 and the clustering loss 717 as a model loss 718. In some embodiments, a weighted summation may be performed on the distance loss and the clustering loss to obtain the model loss, so as to flexibly adjust weight ratios of the distance loss and the clustering loss.

After completing the above-mentioned training flow, the computer device updates the negative sample image feature based on the first image feature and the second image feature to ensure that the negative sample image feature queue contains the image features of the 1 most recently inputted original image. Illustratively, as shown in FIG. 7, the computer device updates the negative sample image feature 713 based on the first target feature 709 and the third target feature 711.

Step 605: Train the first feature extraction network by a back propagation algorithm based on the model loss.

In one possible implementation, in the model training process, a network parameter of the first feature extraction network participates in a gradient back-propagation, and a network parameter of the second feature extraction network does not participate in the gradient back-propagation, but are obtained by updating the network parameter of the first feature extraction network. Therefore, when the model training is performed based on the model loss, the computer device adjusts the network parameter of the first feature extraction network by the back propagation algorithm to complete a round of training on the feature extraction network.

Illustratively, as shown in FIG. 7, the computer device updates the parameter of the first feature extraction network 704 based on the model loss 718.

Step 606: Update the network parameter of the second feature extraction network based on a network parameter of a trained first feature extraction network.

After completing the training of the first feature extraction network, the computer device further updates the network parameter of the second feature extraction network according to the network parameter of the trained first feature extraction network. In one possible implementation, the computer device may update the network parameter of the second feature extraction network based on the network parameter of the first feature extraction network in a moving average mode, and the moving average process may be represented as:

$$\theta_B \leftarrow m\theta_B + (1-m)\theta_A$$

$\theta_B$ is the network parameter of the second feature extraction network, $\theta_A$ is the network parameter of the first feature extraction network, and m is a control parameter.

Illustratively, as shown in FIG. 7, the computer device updates the network parameter of the second feature extraction network 706 by the moving average based on an updated network parameter of the first feature extraction network 704.

In this embodiment, the computer device determines the distance loss based on a feature distance between the positive sample image features and a feature distance between the positive sample image feature and the negative sample image feature, so that the feature extraction network can learn the similarity of the features between similar images and the difference of the features between dissimilar images in the training process; in addition, clustering the image features and determining the clustering loss based on a distance between the image features and each class cluster centroid after clustering is helpful to improve the cohesion between similar images and improve the quality of the feature extraction of the feature extraction network obtained by training.

Furthermore, in this embodiment, by setting the MGD network and then using the MGD network to perform a polymerization representation on multiple global descriptors, the feature expression of the image feature is improved, which helps to improve the quality of subsequent training.

Moreover, in this embodiment, two MLP are used for processing the image feature to obtain two target features aiming at the same enhanced image, and then the target features are used for clustering to determine the clustering loss, so as to avoid the problem of training difficulties caused by the antagonism between the clustering loss and the distance loss when directly using the image feature to determine the clustering loss.

Under different microscope magnifications, the same medical image often contains different semantic information, which leads to distinct similarities. Therefore, when training the feature extraction model, the computer device needs to perform model training based on the medical images under the same magnification, and accordingly, the feature extraction model obtained by training is configured to perform a feature extraction on an image at the target magnification. In one possible implementation, on the basis of FIG. 4, as shown in FIG. 10, before performing the data enhancement on the original medical image, the method further includes the following steps.

Step 4001: Slice a WSI at the target magnification to obtain sliced images.

In general, the medical image appears in a WSI format, which contains images of the same picture at different resolutions. Due to a large amount of data on WSI, it is first necessary to slice the WSI under different microscope magnifications (such as 10 times, 20 times, and 40 times) to obtain several sliced images. An image size of each sliced image is the same, and conforms to an image output size of the feature extraction model.

In some embodiments, when a feature extraction model corresponding to the target magnification needs to be trained, the computer device slices the WSI at the target magnification to obtain the sliced images.

Step 4002: Filter the sliced images based on the image information content to obtain the original medical image.

For a sliced image located at an edge, since the image information content contained in such images is small and not conducive to the subsequent model training Therefore, after completing slicing, the computer device also needs to filter the sliced images according to the image information content, filter the sliced image with a small amount of image data, and finally obtain the original medical image.

Figure 11:
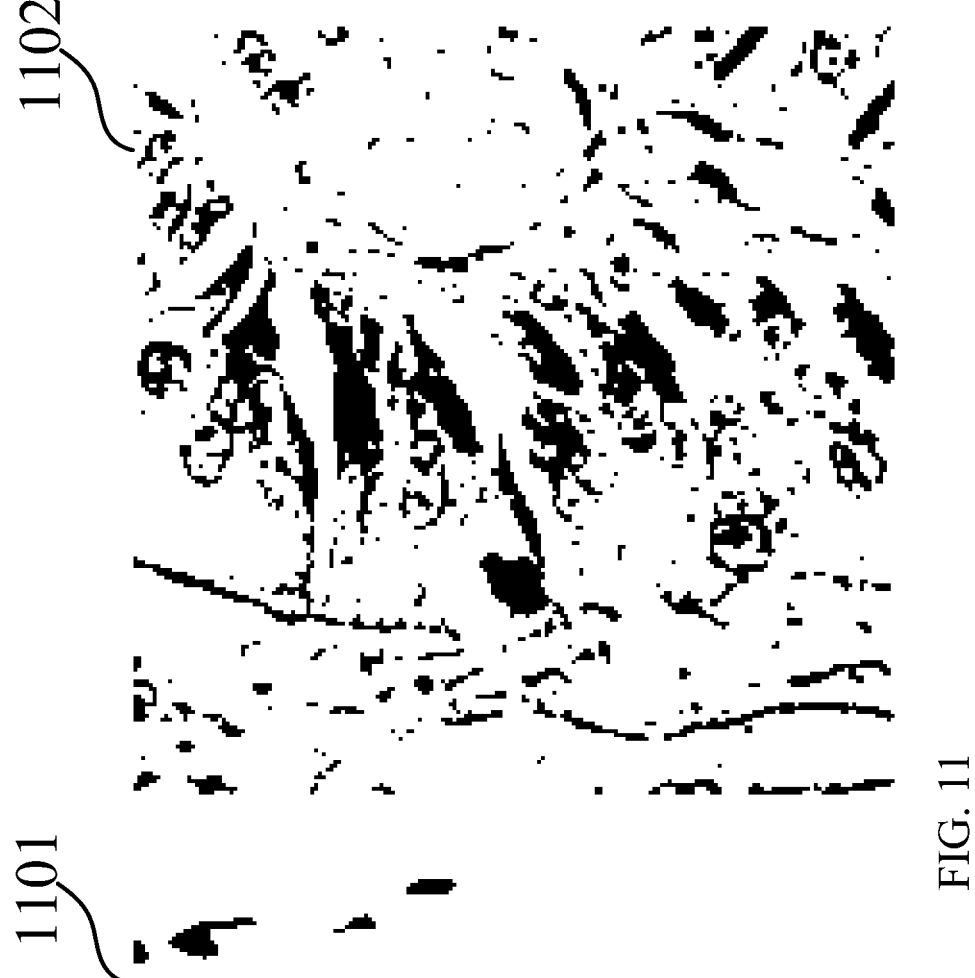
FIG. 11 is a schematic diagram of a valid sample and an invalid sample shown in an exemplary embodiment of this application.

Illustratively, as shown in FIG. 11, a first sliced image 1101 is an invalid sample that needs to be filtered, while a second sliced image 1102 is a valid sample that needs to be retained.

Furthermore, in a practical application process, if the magnification of the medical image cannot be known, when the computer device performs the feature extraction on the medical image using a trained feature extraction network, an extracted image feature may be inaccurate. To improve the quality of the feature extraction in this case, in one possible implementation, the computer device trains a magnification prediction model based on the original medical images under different magnifications. The magnification prediction model is configured to predict a magnification of the input image.

In some embodiments, the computer device trains the magnification prediction model with a magnification corresponding to the original medical image as a supervision, and a trained magnification prediction model is configured to output the probabilities of various magnifications. For example, when magnifications of the medical image include 10 times, 20 times, and 40 times, if results outputted by the magnification prediction model are 0.01, 0.95, and 0.04, it means the probability that the magnification of the input medical image is 10 times is 0.01, the probability that the magnification is 20 times is 0.95, and the probability that the magnification is 40 times is 0.04.

In the application process, prediction results of the magnification prediction model are used for performing a feature fusion on image features extracted by different feature extraction models. In one possible implementation, after obtaining the probabilities of the magnifications of the medical image by the magnification prediction model, the computer device performs the feature extraction on the medical image by the feature extraction models corresponding to different magnifications, and then performs the feature fusion (such as a feature weighted summation) on the image features extracted by different feature extraction models based on predicted probabilities, so as to perform subsequent processing based on image features obtained by the fusion.

Figure 12:
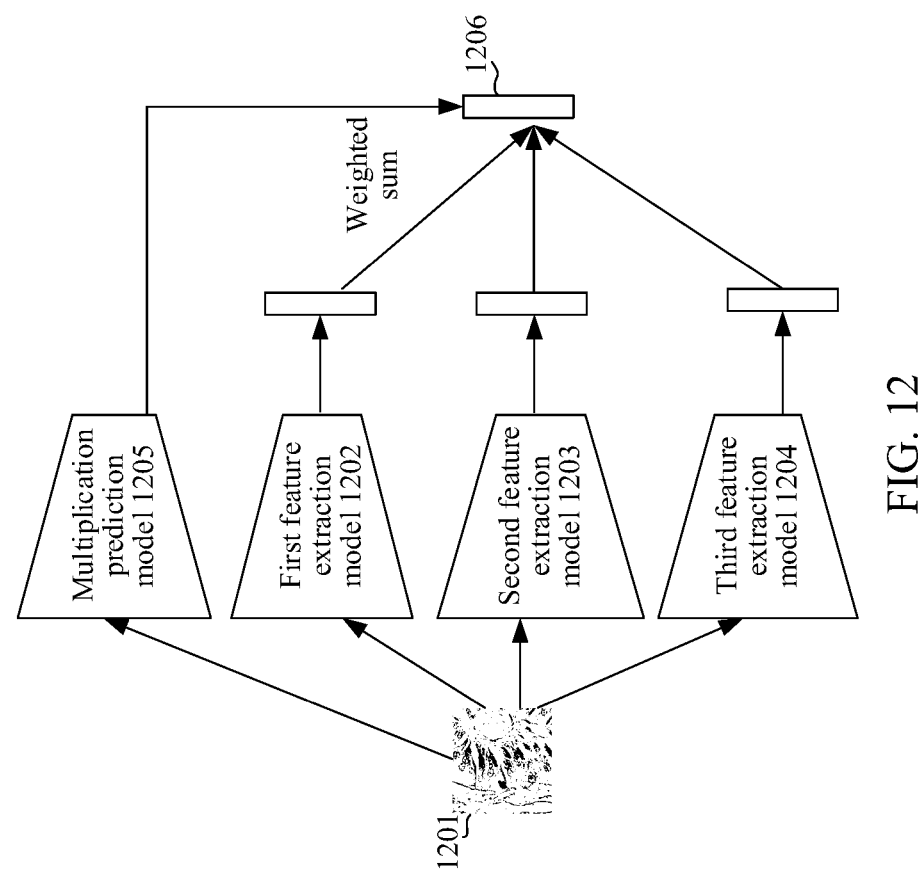
FIG. 12 is a schematic diagram of an implementation of a weighted summation process for multiple image features shown in an exemplary embodiment of this application.

Illustratively, as shown in FIG. 12, the computer device performs the feature extraction on a medical image 1201 by a first feature extraction model 1202, a second feature extraction model 1203, and a third feature extraction model 1204 (corresponding to different magnifications), and performs a magnification prediction on the medical image 1201 by a magnification prediction model 1205, and then performs a weighted summation on the image features outputted by the three feature extraction models based on magnification prediction results to obtain a target image feature 1206.

Figure 13:
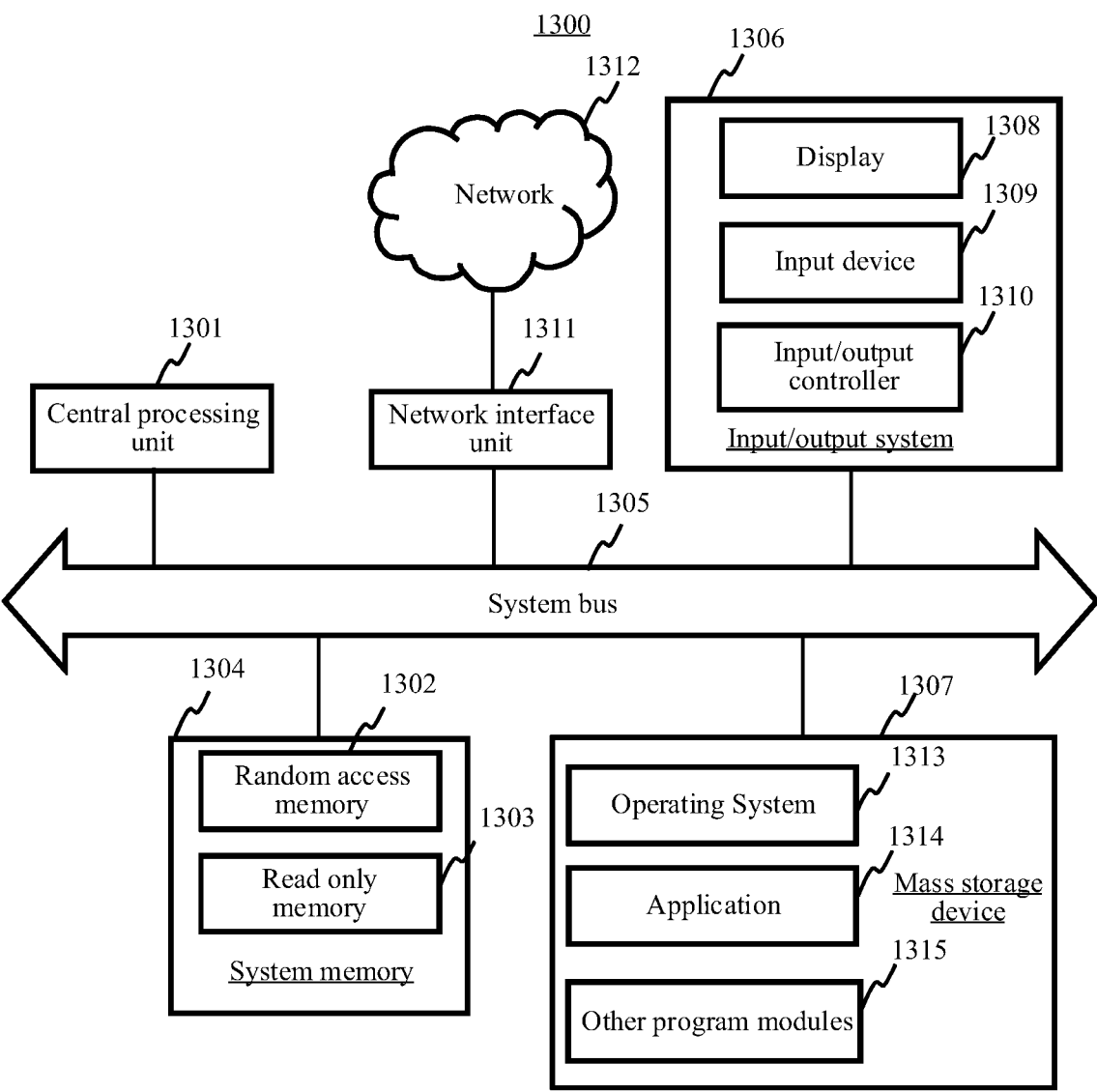
FIG. 13 is a structure schematic diagram of a computer device provided by an exemplary embodiment of this application.

Referring to FIG. 13, which illustrates a structure schematic diagram of the computer device provided by an exemplary embodiment of this application. Specifically: the computer device 1300 includes a central processing unit (CPU) 1301, a system memory 1304 including a random access memory 1302 and a read-only memory 1303, and a system bus 1305 connecting the system memory 1304 and the CPU 1301. The computer device 1300 also includes a basic input/output system (I/O system) 1306 to help transmit information between elements within the computer, and a mass storage device 1307 for storing an operating system 1313, an application 1314, and other program modules 1315.

The basic I/O system 1306 includes a display 1308 for displaying information and an input device 1309 such as a mouse, a keyboard for inputting information by the user. The display 1308 and the input device 1309 are connected to the CPU 1301 by an input output controller 1310 connected to the system bus 1305. The basic I/O system 1306 may also include the input output controller 1310 for receiving and processing input from multiple other devices, such as the keyboard, the mouse, or an electronic stylus. Similarly, the input output controller 1310 also provides outputs to a display screen, a printer, or other types of output devices.

The mass storage device 1307 is connected to the CPU 1301 by a mass storage controller (not shown) connected to the system bus 1305. The mass storage device 1307 and its associated computer-readable medium provide non-volatile storage for the computer device 1300. That is, the mass storage device 1307 may include the computer readable-medium (not shown) such as a hard disk or a driver.

Without loss of generality, the computer-readable medium may include a computer storage medium and a communication medium. The computer storage medium includes volatile and non-volatile, removable and non-removable media implemented in any method or technology for storing information, such as a computer-readable instruction, a data structure, a program module, or other data. The computer storage medium includes a random access memory (RAM), a read-only memory (ROM), a flash memory or other solid state storage technology, a compact disc read-only memory (CD-ROM), a digital versatile disc (DVD) or other optical storage, a magnetic cassette, a magnetic tape, a magnetic disk storage, or other magnetic storage devices. Of course, a person skilled in the art may know that the computer storage medium is not limited to the above. The system memory 1304 and the mass storage device 1307 described above may be collectively referred to as memory.

The memory stores one or more programs configured to be performed by one or more CPUs 1301. The one or more programs contain instructions for implementing the methods described above, and the CPU 1301 performs the methods provided by the various method embodiments described above implemented by the one or more programs.

According to various embodiments of this application, the computer device 1300 may also operate by connecting to a remote computer on the network by the network such as the Internet. That is, the computer device 1300 may be connected to a network 1312 by a network interface unit 1311 connected to the system bus 1305, or may be connected to other types of networks or remote computer systems (not shown) using the network interface unit 1311.

The memory also includes one or more programs stored in the memory, and the one or more programs contain steps performed by the computer device for performing the methods provided in the embodiments of this application.

Figure 14:
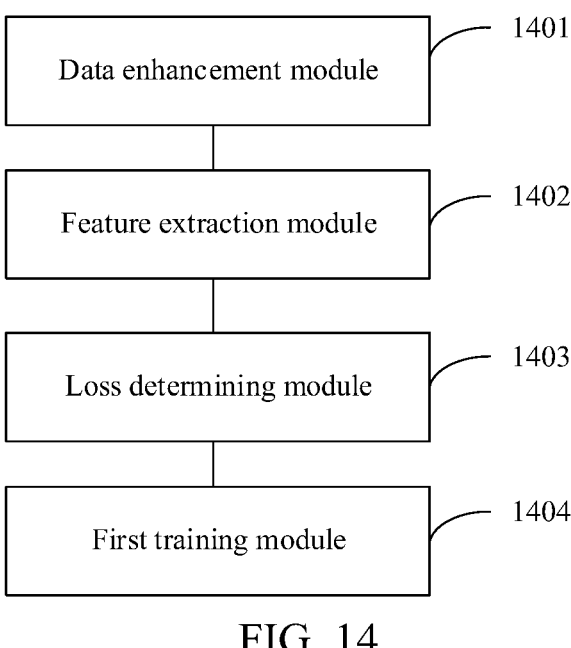
FIG. 14 is a structure block diagram of a self-supervised learning apparatus for image features provided by an exemplary embodiment of this application.

FIG. 14 is a structure block diagram of a self-supervised learning apparatus for image features provided by an exemplary embodiment of this application, and the apparatus includes:

a data enhancement module 1401, configured to perform the data enhancement on the original medical image to obtain the first enhanced image and the second enhanced image, the first enhanced image and the second enhanced image being positive samples of each other;

a feature extraction module 1402, configured to perform feature extractions on the first enhanced image and the second enhanced image by the feature extraction model to obtain the first image feature of the first enhanced image and the second image feature of the second enhanced image;

a loss determining module 1403, configured to determine the model loss of the feature extraction model based on the first image feature, the second image feature, and the negative sample image feature, the negative sample image feature being the image feature corresponding to other original medical images; and a first training module 1404, configured to train the feature extraction model based on the model loss.

In some embodiments, the feature extraction model includes the first feature extraction branch and the second feature extraction branch, and the first feature extraction branch and the second feature extraction branch use feature extraction networks with different parameters.

The feature extraction module 1402 includes:

a first extraction unit, configured to perform the feature extraction on the first enhanced image by the first feature extraction branch to obtain the first image feature; and a second extraction unit, configured to perform the feature extraction on the second enhanced image by the second feature extraction branch to obtain the second image feature.

In some embodiments, the first feature extraction branch includes the first feature extraction network and the MGD network, the second feature extraction branch includes the second feature extraction network and the MGD network, and the MGD network is used for polymerizing and outputting image features under different descriptors.

The first extraction unit is further configured to:

perform the feature extraction on the first enhanced image by the first feature extraction network to obtain the first intermediate image feature;

perform at least two types of pooling on the first intermediate image feature by the MGD network to obtain at least two first global descriptors; and cascade the at least two first global descriptors by the MGD network, and generate the first image feature based on the cascaded first global descriptors.

The second extraction unit is further configured to:

perform the feature extraction on the second enhanced image by the second feature extraction network to obtain the second intermediate image feature;

perform at least two pooling on the second intermediate image feature by the MGD network to obtain at least two global descriptors; and cascade the at least two second global descriptors by the MGD network, and generating the second image feature based on the cascaded second global descriptors.

In some embodiments, the first training module 1404 includes:

a first training unit, configured to train the first feature extraction network by the back propagation algorithm based on the model loss; and a second training unit, configured to update the network parameter of the second feature extraction network based on the network parameter of the trained first feature extraction network.

In some embodiments, the loss determining module 1403 includes:

a first loss determining unit, configured to determine the distance loss based on the feature distance between the first image feature and the second image feature and the feature distance between the first image feature and the negative sample image feature;

a second loss determining unit, configured to cluster the first image features and the second image features corresponding to each of the original medical images in the current training batch, and determining the clustering loss based on the clustering result; and a total loss determining unit, configured to determine the model loss according to the distance loss and the clustering loss.

In some embodiments, the second loss determining unit is configured to:

cluster the first image features corresponding to each of the original medical images in the current training batch to obtain k first class cluster centroids, k being the integer greater than or equal to 2;

cluster the second image features corresponding to each of the original medical images in the current training batch to obtain k second class cluster centroids; and determine the clustering loss based on the distance between the first image feature and the k second class cluster centroids and the distance between the second image feature and the k first class cluster centroids.

In some embodiments, the apparatus further includes:

a first generation module, configured to generate the first target feature and the second target feature corresponding to the original medical image based on the first image feature; and a second generation module, configured to generate the third target feature and the fourth target feature corresponding to the original medical image based on the second image feature.

The first loss determining unit is further configured to:

determine the distance loss based on the feature distance between the first target feature and the third target feature and the feature distance between the first target feature and the negative sample image feature.

The second loss determining unit is further configured to:

cluster second target features corresponding to each of the original medical images in the current training batch to obtain k third class cluster centroids;

cluster fourth target features corresponding to each of the original medical images in the current training batch to obtain k fourth class cluster centroids; and determine the clustering loss based on the distance between the first target feature and the k fourth class cluster centroids and the distance between the third target feature and the k third class cluster centroids.

In some embodiments, the first generation module is configured to:

input the first image feature into the first MLP and the second MLP to obtain the first target feature and the second target feature.

In some embodiments, the second generation module is configured to:

input the second image feature into the first MLP and the second MLP to obtain the third target feature and the fourth target feature.

In some embodiments, the data enhancement module 1401 includes:

a first enhancement unit, configured to perform a color enhancement and a direction enhancement on the original medical image based on the first enhancement parameter to obtain the first enhanced image; and a second enhancement unit, configured to perform a color enhancement and a direction enhancement on the original medical image by the second enhancement parameter to obtain the second enhanced image, the first enhancement parameter and the second enhancement parameter being different.

In some embodiments, the apparatus further includes:

an update module, configured to update the negative sample image feature based on the first image feature and the second image feature.

In some embodiments, the feature extraction model is configured to perform the feature extraction on the image at the target magnification.

The apparatus includes:

a sliced module, configured to slice a WSI at the target magnification to obtain sliced images; and a filtering module, configured to filter the sliced images based on the image information content to obtain the original medical image.

In some embodiments, the apparatus further includes:

a second training module, configured to train the magnification prediction model based on the original medical images under different magnifications, the magnification prediction model configured to predict the magnification of the input image, and prediction results of the magnification prediction model for performing the feature fusion on image features extracted by different feature extraction models.

In summary, in the embodiments of this application, the first enhanced image and the second enhanced image being positive samples of each other are obtained by performing the data enhancement on the original medical image. The first image feature and the second image feature are obtained by performing feature extractions by the feature extraction model. Then other original medical images being different from the original medical image are taken as the negative sample. The model loss of the feature extraction model is determined based on the first image feature, the second image feature, and the negative sample image feature, and finally the feature extraction model is trained using the model loss. In the whole process, the self-supervised learning is used to enable the feature extraction model learn the image features of the medical image, without manual annotation on the medical image, which reduces the cost of manual annotation in the model training process and improves the training efficiency of the feature extraction model.

In this embodiment, the computer device determines the distance loss based on a feature distance between the positive sample image features and a feature distance between the positive sample image feature and the negative sample image feature, so that the feature extraction network can learn the similarity of the features between similar images and the difference of the features between dissimilar images in the training process; in addition, clustering the image features and determining the clustering loss based on a distance between the image features and each class cluster centroid after clustering is helpful to improve the cohesion between similar images and improve the quality of the feature extraction of the feature extraction network obtained by training.

Furthermore, in this embodiment, by setting the MGD network and then using the MGD network to perform a polymerization representation on multiple global descriptors, the feature expression of the image feature is improved, which helps to improve the quality of subsequent training.

Moreover, in this embodiment, two MLP are used for processing the image feature to obtain two target features aiming at the same enhanced image, and then the target features are used for clustering to determine the clustering loss, so as to avoid the problem of training difficulties caused by the antagonism between the clustering loss and the distance loss when directly using the image feature to determine the clustering loss.

The apparatus provided in the above-mentioned embodiments is merely exemplified by the division of the above-mentioned functional modules; in practical application, the above-mentioned functional allocation may be completed by different functional modules according to needs, i.e., dividing the internal structure of the apparatus into different functional modules so as to complete all or part of the functions described above. In addition, the apparatus provided by the above-mentioned embodiments and the method embodiments belong to the same idea, and the implementation process thereof is detailed in the method embodiments, which will not be described again here.

Embodiments of this application also provide a computer-readable storage medium having at least one instruction stored therein, the at least one instruction being loaded and performed by the processor to implement the self-supervised learning method for image features as described in any of the embodiments above.

Illustratively, the computer-readable storage medium may include: ROM, RAM, solid state drives (SSD), or an optical disk, etc. The RAM may include a resistance random access memory (ReRAM) and a dynamic random-access memory (DRAM).

Embodiments of this application provide a computer program product or computer program including a computer instruction, the computer instruction being stored in a computer-readable storage medium. The processor of the computer device reads the computer instruction from the computer-readable storage medium, and the processor performs the computer instructions to cause the computer device to perform the self-supervised learning method for image features according to the embodiments described above.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. A person skilled in the art may appreciate that all or a part of the steps for implementing the above embodiments may be completed by hardware, or may be completed by a program that instructs the associated hardware. The program may be stored on the computer-readable storage medium, such as the read-only memory, a magnetic disk, or the optical disk.

The foregoing is merely exemplary embodiments of this application and is not intended to limit this application. Any modifications, equivalents, improvements, etc. that fall within the spirit and principles of this application shall be contained within the scope of this application.

What is claimed is:

1. A self-supervised learning method for extracting image features, performed by a computer device, the method comprising:

performing a data enhancement on an original medical image to obtain a first enhanced image and a second enhanced image, the first enhanced image and the second enhanced image being positive samples of each other;

performing feature extractions on the first enhanced image and the second enhanced image by a feature extraction model to obtain a first image feature of the first enhanced image and a second image feature of the second enhanced image;

determining a model loss of the feature extraction model based on the first image feature, the second image feature, and a negative sample image feature, the negative sample image feature being an image feature corresponding to other original medical images, wherein the model loss includes a distance loss and a clustering loss, and the determining includes:

determining the distance loss based on (i) a feature distance between the first image feature and the second image feature and (ii) a feature distance between the first image feature and the negative sample image feature; and determining the clustering loss based on a clustering result that is obtained by (a) clustering first image features corresponding to each original medical image, of multiple original medical images, in a current training batch and (b) clustering second image features corresponding to each original medical image of the multiple original medical images in the current training batch; and training the feature extraction model based on the model loss that includes the distance loss and the clustering loss.

2. The method according to claim 1, wherein the feature extraction model comprises a first feature extraction network, a second feature extraction network, and a multiple global descriptor (MGD) network; and performing the feature extractions on the first enhanced image and the second enhanced image by the feature extraction model comprises:

performing a feature extraction on the first enhanced image and/or the second enhanced image by the first feature extraction network and/or the second feature extraction network, respectively, to obtain a first intermediate image feature and/or a second intermediate image feature;

performing at least two types of pooling on the first intermediate image feature and/or the second intermediate image feature by the MGD network to obtain at least a pair of first global descriptors and/or at least a pair of second global descriptors; and cascading the at least the pair of first global descriptors and/or at least the pair of second global descriptors by the MGD network, and generating the first image feature and/or the second image feature based on the cascaded first global descriptors and/or the cascaded second global descriptors, respectively.

3. The method according to claim 2, wherein training the feature extraction model based on the model loss comprises:

training the first feature extraction network by a back propagation algorithm based on the model loss; and updating the second feature extraction network based on the trained first feature extraction network.

4. The method according to claim 1, wherein performing the data enhancement on the original medical image to obtain the first enhanced image and the second enhanced image comprises:

performing a color enhancement and a direction enhancement on the original medical image by a first enhancement parameter to obtain the first enhanced image; and performing a color enhancement and a direction enhancement on the original medical image by a second enhancement parameter to obtain the second enhanced image, the first enhancement parameter and the second enhancement parameter being different.

5. The method according to claim 1, further comprising:

after training the feature extraction model based on the model loss, updating the negative sample image feature based on the first image feature and the second image feature.

6. The method according to claim 1, wherein:

the feature extraction model is configured to perform a feature extraction on an image at a target magnification; and the method further comprises, before performing a data enhancement on an original medical image to obtain a first enhanced image and a second enhanced image:

slicing a whole slide image (WSI) at the target magnification to obtain sliced images; and filtering the sliced images based on image information content to obtain the original medical image.

7. A computer device, comprising a processor and a memory having stored therein at least one instruction, the at least one instruction, when executed by the processor, cause the computer device to implement operations including:

performing a data enhancement on an original medical image to obtain a first enhanced image and a second enhanced image, the first enhanced image and the second enhanced image being positive samples of each other;

performing feature extractions on the first enhanced image and the second enhanced image by a feature extraction model to obtain a first image feature of the first enhanced image and a second image feature of the second enhanced image;

determining a model loss of the feature extraction model based on the first image feature, the second image feature, and a negative sample image feature, the negative sample image feature being an image feature corresponding to other original medical images, wherein the model loss includes a distance loss and a clustering loss, and the determining includes:

determining the distance loss based on (i) a feature distance between the first image feature and the second image feature and (ii) a feature distance between the first image feature and the negative sample image feature; and determining the clustering loss based on a clustering result that is obtained by (a) clustering first image features corresponding to each original medical image, of multiple original medical images, in a current training batch and (b) clustering second image features corresponding to each original medical image of the multiple original medical images in the current training batch; and training the feature extraction model based on the model loss that includes the distance loss and the clustering loss.

8. The computer device according to claim 7, wherein the feature extraction model comprises a first feature extraction network, a second feature extraction network, and a multiple global descriptor (MGD) network; and performing the feature extractions on the first enhanced image and the second enhanced image by the feature extraction model comprises:

performing a feature extraction on the first enhanced image and/or the second enhanced image by the first feature extraction network and/or the second feature extraction network, respectively, to obtain a first intermediate image feature and/or a second intermediate image feature;

performing at least two types of pooling on the first intermediate image feature and/or the second intermediate image feature by the MGD network to obtain at least a pair of first global descriptors and/or at least a pair of second global descriptors; and cascading the at least the pair of first global descriptors and/or at least the pair of second global descriptors by the MGD network, and generating the first image feature and/or the second image feature based on the cascaded first global descriptors and/or the cascaded second global descriptors, respectively.

9. The computer device according to claim 8, wherein training the feature extraction model based on the model loss comprises:

training the first feature extraction network by a back propagation algorithm based on the model loss; and updating the second feature extraction network based on the trained first feature extraction network.

10. The computer device according to claim 7, wherein performing the data enhancement on the original medical image to obtain the first enhanced image and the second enhanced image comprises:

performing a color enhancement and a direction enhancement on the original medical image by a first enhancement parameter to obtain the first enhanced image; and performing a color enhancement and a direction enhancement on the original medical image by a second enhancement parameter to obtain the second enhanced image, the first enhancement parameter and the second enhancement parameter being different.

11. The computer device according to claim 7, wherein the operations further include:

after training the feature extraction model based on the model loss, updating the negative sample image feature based on the first image feature and the second image feature.

12. The computer device according to claim 7, wherein:

the feature extraction model is configured to perform a feature extraction on an image at a target magnification; and the operations further include, before performing a data enhancement on an original medical image to obtain a first enhanced image and a second enhanced image:

slicing a whole slide image (WSI) at the target magnification to obtain sliced images; and filtering the sliced images based on image information content to obtain the original medical image.

13. A non-transitory computer-readable storage medium, storing at least one instruction, the at least one instruction, when executed by a processor of a computer device, cause the computer device to perform operations including:

performing a data enhancement on an original medical image to obtain a first enhanced image and a second enhanced image, the first enhanced image and the second enhanced image being positive samples of each other;

performing feature extractions on the first enhanced image and the second enhanced image by a feature extraction model to obtain a first image feature of the first enhanced imag and a second image feature of the second enhanced image;

determining a model loss of the feature extraction model based on the first image feature, the second image feature, and a negative sample image feature, the negative sample image feature being an image feature corresponding to other original medical images, wherein the model loss includes a distance loss and a clustering loss, and the determining includes:

determining the distance loss based on (i) a feature distance between the first image feature and the second image feature and (ii) a feature distance between the first image feature and the negative sample image feature; and determining the clustering loss based on a clustering result that is obtained by (a) clustering first image features corresponding to each original medical image, of multiple original medical images, in a current training batch and (b) clustering second image features corresponding to each original medical image of the multiple original medical images in the current training batch; and training the feature extraction model based on the model loss that includes the distance loss and the clustering loss.

14. The non-transitory computer-readable storage medium according to claim 13, wherein the feature extraction model comprises a first feature extraction network, a second feature extraction network, and a multiple global descriptor (MGD) network; and performing the feature extractions on the first enhanced image and the second enhanced image by the feature extraction model comprises:

performing a feature extraction on the first enhanced image and/or the second enhanced image by the first feature extraction network and/or the second feature extraction network, respectively, to obtain a first intermediate image feature and/or a second intermediate image feature;

performing at least two types of pooling on the first intermediate image feature and/or the second intermediate image feature by the MGD network to obtain at least a pair of first global descriptors and/or at least a pair of second global descriptors; and cascading the at least the pair of first global descriptors and/or at least the pair of second global descriptors by the MGD network, and generating the first image feature and/or the second image feature based on the cascaded first global descriptors and/or the cascaded second global descriptors, respectively.

15. The non-transitory computer-readable storage medium according to claim 14, wherein training the feature extraction model based on the model loss comprises:

training the first feature extraction network by a back propagation algorithm based on the model loss; and updating the second feature extraction network based on the trained first feature extraction network.

16. The non-transitory computer-readable storage medium according to claim 13, wherein performing the data enhancement on the original medical image to obtain the first enhanced image and the second enhanced image comprises:

performing a color enhancement and a direction enhancement on the original medical image by a first enhancement parameter to obtain the first enhanced image; and performing a color enhancement and a direction enhancement on the original medical image by a second enhancement parameter to obtain the second enhanced image, the first enhancement parameter and the second enhancement parameter being different.

17. The non-transitory computer-readable storage medium according to claim 13, wherein:

the feature extraction model is configured to perform a feature extraction on an image at a target magnification; and the operations further include, before performing a data enhancement on an original medical image to obtain a first enhanced image and a second enhanced image:

slicing a whole slide image (WSI) at the target magnification to obtain sliced images; and filtering the sliced images based on image information content to obtain the original medical image.

18. The method according to claim 1, wherein determining the clustering loss further includes:

clustering the first image features corresponding to each original medical image of the multiple original medical images in the current training batch, to obtain k first class cluster centroids, wherein k is an integer that is at least 2;

clustering the second image features corresponding to each original medical image of the multiple original medical images in the current training batch, to obtain k second class cluster centroids; and determining the clustering loss based on (i) a distance between the first image features and the k second class cluster centroids and (ii) a distance between the second image features and the k first class cluster centroids.

19. The computer device according to claim 7, wherein determining the clustering loss further includes:

clustering the first image features corresponding to each original medical image of the multiple original medical images in the current training batch, to obtain k first class cluster centroids, wherein k is an integer that is at least 2;

clustering the second image features corresponding to each original medical image of the multiple original medical images in the current training batch, to obtain k second class cluster centroids; and determining the clustering loss based on (i) a distance between the first image features and the k second class cluster centroids and (ii) a distance between the second image features and the k first class cluster centroids.

20. The non-transitory computer-readable storage medium according to claim 13, wherein determining the clustering loss further includes:

clustering the first image features corresponding to each original medical image of the multiple original medical images in the current training batch, to obtain k first class cluster centroids, wherein k is an integer that is at least 2;

clustering the second image features corresponding to each original medical image of the multiple original medical images in the current training batch, to obtain k second class cluster centroids; and determining the clustering loss based on (i) a distance between the first image features and the k second class cluster centroids and (ii) a distance between the second image features and the k first class cluster centroids.

* * * * *